Nov. 22, 1932.   W. R. APPERMAN   1,888,871
AIRPLANE
Original Filed July 27, 1928   2 Sheets-Sheet 1
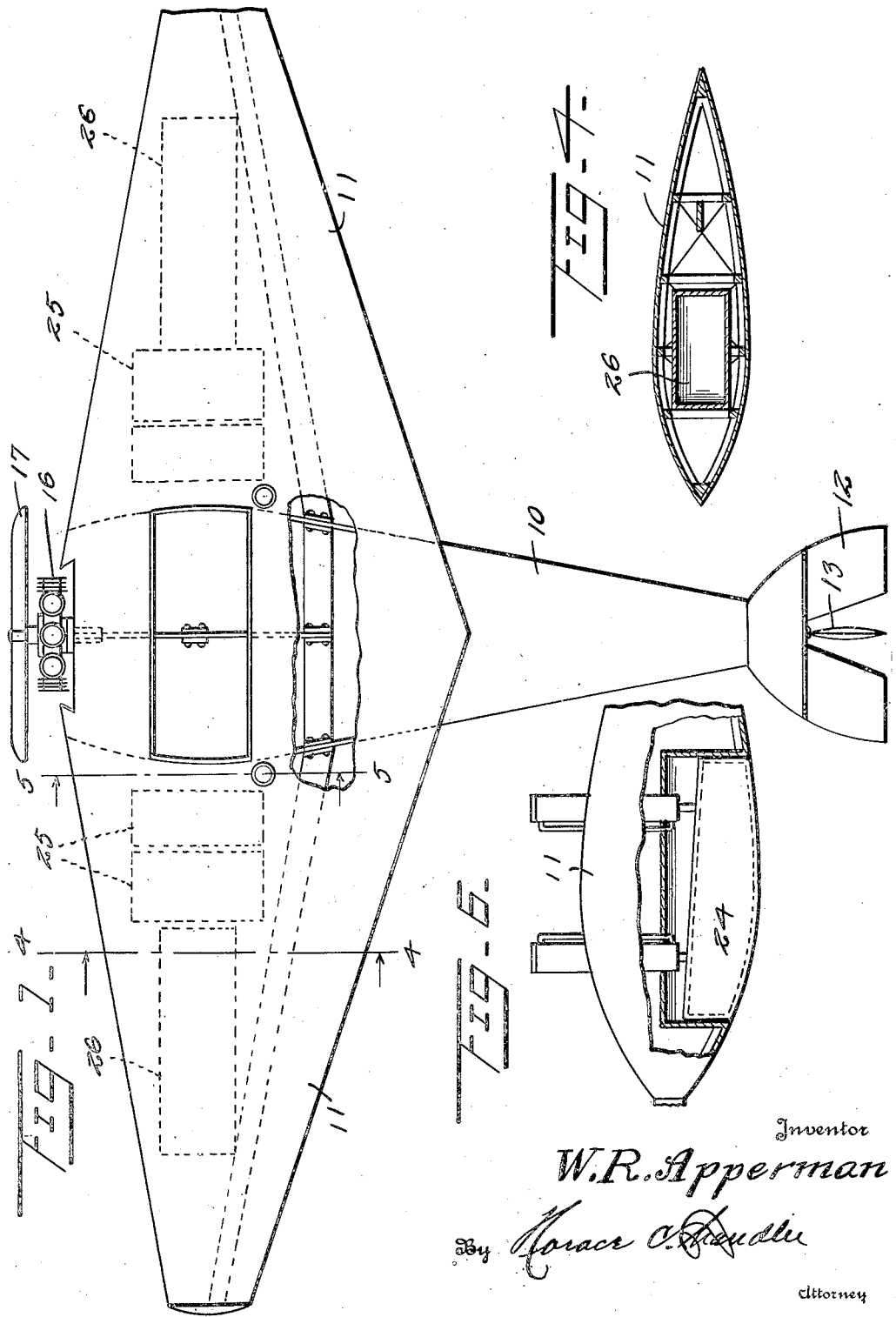

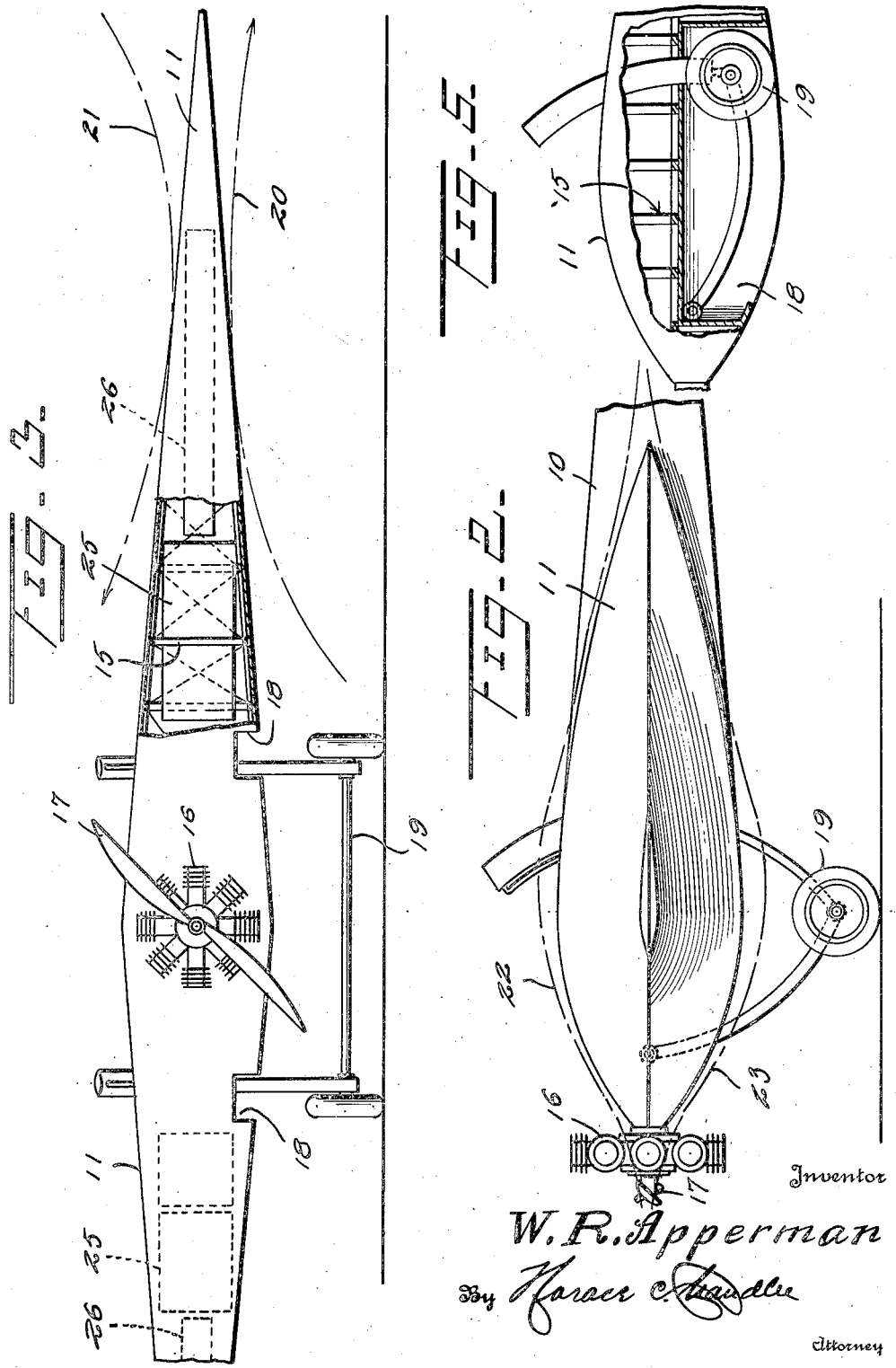

Patented Nov. 22, 1932

1,888,871

UNITED STATES PATENT OFFICE

WALTER R. APPERMAN, OF FORT WORTH, TEXAS

AIRPLANE

Application filed July 27, 1928, Serial No. 295,742. Renewed April 9, 1932.

This invention relates to new and useful improvements in airships, and particularly to the heavier-than-air type of airships.

One object of the present invention is to provide an airship, of this character, wherein the plane or wing construction is such that head resistance is reduced to a minimum, by reason of the fact that all spars, braces, struts, and the like, are concealed therewithin.

Another object is to provide a device of this character wherein the planes, or wings, are of the cantilever construction, thus eliminating a large number of braces and struts, ordinarily used in this type of ship.

Another object is to provide a device of this character which permits passengers and weight to be carried within the wings or planes, and the distribution of the passengers and weight to be made in space provided therefor laterally within the thick wings and along the line of the center of pressure, which accordingly becomes the line of the center of gravity, whereby the ship will always be balanced along this line, regardless of the load carried.

Another object is to provide a wing or plane construction wherein the center of gravity and the center of pressure are arranged along the entire spread of such wing or plane construction, thus resulting in the constant and invariable disposition of such centers.

A further object is to provide a wing or plane construction within which are mounted fuel tanks, and air-tight and water-tight compartments, the latter being especially adapted for hydroplane constructions.

A still further object is to provide a wing or plane construction in which both the motor and landing gear may be properly disposed whereby to obviate resistance while in flight.

A still further object is to provide a plane or wing construction wherein the landing gear may be withdrawn, so as to preclude any possibility of offering resistance to the forward motion of the ship, one form including ground wheels, and another form including pontoons, the latter being so formed as to complete the contour of the lower faces of the wings or planes, when withdrawn.

Other objects and advantages will be apparent from the following description when taken in connection with the accompanying drawings:

In the drawings:

Figure 1 is a top plan view of an airship made in accordance with the present invention, the type of ship being a monoplane.

Figure 2 is a side elevation of the same.

Figure 3 is a front elevation of the ship.

Figure 4 is a vertical transverse sectional view on the line 4—4 of Figure 1, passing through one of the wings or planes.

Figure 5 is a vertical transverse sectional view on the line 5—5 of Figure 1, showing the wheeled landing gear withdrawn into the wing structures.

Figure 6 is a view similar to Figure 5, but showing a pontoon landing gear withdrawn into the wings.

Referring particularly to the accompanying drawings, 10 represents the fuselage of an airship, of the monoplane type, 11 the laterally extending horizontal wings or planes, connected with each other at their inner ends, while 12 represents the tail plane, and 13 the rudder.

The fuselage is, as will be plain from an inspection of the drawings, formed on "stream lines", as are also the wings or planes 11. It will be particularly noted that the forward or entering edges of the wings or planes extend at obtuse angles in the direction of the tips thereof, while the upper and lower surfaces of such wings taper from the wing unions, at the center of the span, toward the wing tips, the thickest section of each wing being at the center of the span where the left and right wings are joined to each other. The rear edge of each wing extends rearwardly from the tip, toward the fuselage, at an obtuse angle, but to a slightly greater degree than the said forward edge, as will be clearly seen in the top plan view, Figure 1. The fuselage, also of full cantilever construction, is connected to the wings by fuselage unions, as shown in Figure 1. The top and bottom of each wing, and also the fuselage, are covered with all metal "duralumin". The transverse sectional contour of each wing, as shown in the sectional view, Figure 4, is double-cambered, with the thickest portion in a line extending throughout the entire length of the two wings, at a distance approximately one-third rearwardly, of the forward or entering edge. All of the braces, stays, struts, and the like, indicated as a whole by the numeral 15, where the device is broken away in Figure 3, are located entirely within the wings, thereby obviating any resistance and "skin friction".

The motor is seated within a recess in the central portion of the front edge of the planes or wings, and has the propeller 17 disposed on the forward end thereof.

In the lower faces of the wings, at suitable distances from each side of the center of the wing span, are formed recesses 18 which are adapted to receive the pivotally mounted, wheeled landing gear 19, whereby such gear is concealed, while the ship is in flight, removing all head resistance of such gear, during such flight.

In Figure 3, the dotted curved lines indicate the movement of the air, with respect to the longitudinal dimensions of the wings, the upper lines 20 indicate that the air is "washed out", toward the wing tips, while the upper lines 21 indicate that the air is "washed in", toward the thicker inner ends of the wings, because the lift curve is greatest at the center of the span where wings are connected together, and where such wings are thickest, as shown in Figure 2. This action of the air on the wings serves to render the ship stabile laterally, thereby obviating the use of lateral stabilizers or ailerons.

In Figure 2, the upper and lower curved dotted lines 22 and 23 indicate the action of the air upon the double cambered wings, it being readily understood that the entering edges of the wings separate the air into upper and lower strata. It must be assumed that the strata lie flat, conforming to the earth's surface. The stratum of air passing over the center of the span, where the wings are joined together, and are thickest, therefore, receives a greater upward deflection resulting in the greatest upward pull or lift at said center, said upward deflection, and therefore the upward pull, becoming less in proportion to the taper of the wings toward the tips thereof. Therefore, the air "stream lines" are "washed in" or pulled in from the wing tips toward the center of the span, where the upward pull or lift is greatest, because of said greatest deflection occurring at that point.

As shown in Figure 6, the landing gear includes the pontoons 24, the contour of each of which is such that when the landing gear is swung upwardly into the wings, the lower faces of the pontoons conform to the lower faces of the wings, so that a continuous and smooth surface is presented to the air, and head resistance and skin friction obviated.

Properly supported in each of the wings, adjacent the center section or passenger compartment 27, is a fuel tank 25, and in addition to this, a water-tight compartment 26 is mounted in each wing, outwardly of each fuel tank. The disposition of the water-tight compartments is especially useful in hydroplanes or seaplanes, whereby to prevent sinking of the planes when forced to alight on water.

What is claimed is:

An airship including wings connected together at their inner ends whereby to produce a continuous wing spread, and a fuselage connected to and extending rearwardly from the center of the wing spread, said wings and fuselage being double-cambered in cross section, the forward edges of said wings converging forwardly and meeting in the longitudinal center of said fuselage, the rear edges of said wings converging rearwardly and meeting in the longitudinal center of said fuselage.

In testimony whereof, I affix my signature.

WALTER R. APPERMAN.